United States Patent Office 2,887,458
Patented May 19, 1959

2,887,458

THERMOSETTING RESINOUS COATING MATERIAL WITH THIXOTROPIC PROPERTIES AND ARTICLE COATED THEREWITH

Cornelius G. Fitzgerald, Ann Arbor, Mich., and Asaf A. Benderly, Washington, D.C., assignors to the United States of America as represented by the Secretary of the Army No Drawing. Application June 25, 1957
Serial No. 667,995

3 Claims. (Cl. 260—18)

(Granted under Title 35, U.S. Code (1952), sec. 266)

The invention described herein may be manufactured and used by or for the Government for governmental purposes without the payment to us of any royalty thereon.

This invention relates to new thermosetting coating materials and to processes for their applications. More particularly, the present invention relates to epoxy coating compounds having thixotropic properties, and to processes for their applications, in a liquid state, while their curing takes place in a frozen state.

There are many applications for thermosetting coating materials which can be applied in a liquid state to an article either by spraying, brushing or dipping, and which subsequently can be cured. It is of considerable advantage if these coating materials can be cured without an appreciable amount of flow so as to maintain a uniform film thickness about the coated article. Further advantages can be obtained if the protective film can be varied in thickness without difficulty.

Thermosetting resins comprising an epoxy group have many useful characteristics especially as coating compositions. Heretofore these resins, while in a liquid state, have been applied to an article for coating purposes. Effective curing of the resulting film has been performed while the resin was still in the liquid state. Usual curing techniques last for an appreciable period of time. This resulted in numerous disadvantages and undesirable results, since the film would tend to flow and slump to the extent that the film thickness was not uniform throughout when the resin was sufficiently cured. The thickness of the film could not be controlled since the slumping effect was more pronounced as the film thickness increased.

Accordingly, it is an object of this invention to provide a coating material having thixotropic properties.

Another object is to provide a thermosetting resin coating material adapted to be applied as a liquid and adapted to be cured in a frozen state.

A further object is to provide a thermosetting resin comprising an epoxy group as a coating material adapted to be applied as a liquid and adapted to freeze to a relatively immovable state between pot temperatures and effective curing temperatures.

A still further object is to provide a thermosetting resin comprising an epoxy group as a coating material that has substantially indefinite shelf life and desirable thixotropic properties.

An additional object is the provision of a hot dip process for coating an article with a film having uniform thickness throughout.

An important object is the provision of a hot dip process for coating an article whereby freezing of the film will occur at temperatures below dip temperatures and above effective curing temperatures, so that the film thickness will be uniform throughout.

Another important object is the provision of a hot dip process for coating an article whereby the film thickness can be controlled and the thickness maintained uniform throughout.

Basically, the coating material of this invention comprises a thermosetting resin having an epoxy group to which is added a viscosity-influencing agent which may also have an epoxy group so that a desirable viscosity of the base resin is obtained at pot temperatures. A thixotropic agent which may be a hydroxy amide derivative of a fatty acid group is added to the base resin to cause the resin system to freeze at temperatures between pot temperatures and temperatures where thermal curing can occur without appreciable flow. A curing agent such as conventional triethanolamine is thereafter supplied to the resin system and the latter is heated to a predetermined pot temperature. The article to be coated is then dipped into the resin and subsequently removed. The removed article is then subjected to cooling, and at a definite predetermined temperature the resinous film will freeze to a substantially immovable condition. Further cooling to a temperature below the freezing temperature will permit effective thermal curing of the film on the article.

Other objects and advantages of the invention will become apparent from the following description of certain forms of the new coating material and preferred coating processes which are intended to be illustrative of the inventions without limiting its scope.

As far as it can be presently ascertained this invention is most proximately related to thermosetting resins having the epoxy group,

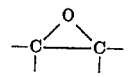

and is preferably concerned and described with reference to epoxy resins that may be characterized by the formula:

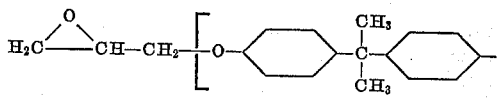 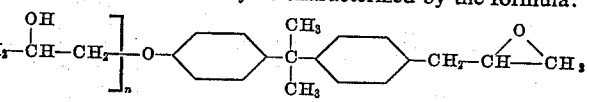

wherein $n$ is ordinarily 0–10. These resins are usually prepared from a reaction of bisphenol and epichlorhydrin. Epoxy resins when employed as a coating material have excellent chemical and moisture resistant properties, superior electrical resistance, and a high order of physical strength. Such a material has a wide application in the protective coating of many electronic components such as transformers, coils, resistors, capacitors and printed circuits, to name but a few. As a consequence of the material's high strength, delicate lead wires can be firmly embedded and supported therein. This physical reinforcement and the film's chemical inertness and moisture resistance help maintain the performance of the coated electrical component at a uniform predetermined level. It is characteristic of the epoxy resins to be suitable for hot-dip application of coatings.

The thickness of the coating obtained on a component by the hot-dip method depends upon the melt viscosity at dip temperature as well as upon the temperature at which the component is maintained prior to dipping or coating. Theoretically, the more viscous the melt the thicker will be the film. Commercially available epoxy resins are not suitable individually to produce the finite viscosity ranges and changes that are desirable to practice the invention. The viscosity of the melt can be effected by the type and amount of a suitable viscosity influencing agent. A suitable viscosity influencing agent will contain the active epoxy group having the formula:

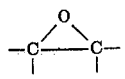

Employing a higher viscosity material or a higher molecular weight solid such as Shell's Epon 1004 or 1007 in a liquid epoxy system, will increase by varying amounts the melt viscosity. Epon 1004 and 1007 are solid epoxies of the epichlorohydrin-bisphenol-A variety with epoxide equivalents of 875–1025 and 1900–2450, respectively. The melt viscosity can be decreased by employing a reactive low viscosity diluent such as styrene oxide or phenyl glycidyl ether. Various effects can be achieved by a change in the basic epoxy thermosetting resin; for example, the liquid epoxy resins, such as Epon 820, 828, and 834, increase in viscosity in the order given and consequently will have a corresponding effect on the melt viscosity of the coating formulation. Epon 820 and 828 are liquid epoxies of the epichlorohydrin-bisphenol-A variety with epoxide equivalents of 185–205. Epon 834 is a liquid epoxy of the epichlorohydrin-bisphenol-A variety with an epoxide equivalent of 225–290. The viscosity of a liquid epoxy resin system may be controlled at a given temperature by mixing the proper amounts of a higher viscosity epoxy with a lower viscosity epoxy. As an illustration, a common liquid epoxy resin designated Epon 828 has a viscosity of approximately 12,500 centipoise at 25° C. As increasing amounts of Epon 1007 are dissolved in Epon 828, the room temperature viscosity increases, and a 50/50 mixture of the two epoxies results in an extremely viscous liquid. As the temperature of these various resin mixtures is increased, the viscosity of the mixtures decreases. However, these mixtures will have substantially parallel temperature viscosity curves and consequently at higher temperatures the differences in their viscosities are still pronounced. Employing this convenient analysis at any temperature below the softening point of the solid epoxy resin, a mixture of any desirable viscosity at dip temperature may be obtained, the minimum limiting value being the viscosity of the more fluid resin at the given temperature. Of course, if the viscosity of the base epoxy resin is satisfactory at a given temperature, a viscosity influencing agent is not necessary. Controlling the viscosity of the resin system at a given temperature is a very effective manner of influencing the thickness of the coating material, particularly when applied by a dipping technique.

In order to maintain a uniform thickness of the coating resin and to prevent flow, a thixotropic agent is employed with the epoxy system. An ideal thixotropic agent will produce a sharp transition point in the viscosity of the resin system at a critical transition temperature. Above this transition temperature, the thixotropic agent has a negligible effect on the viscosity of the resin system, whereas below this transition temperature a frozen or semi-solid state is encountered and the resin is no longer free to flow. Presumably, an ideal thixotropic agent would produce a sharp transition temperature, but in practice it has been found that first an incipient frozen state is reached, and upon further reduction of temperature the entire resin mass ultimately freezes. Normally these two temperatures differ by only one or two degrees. A thixotropic agent functioning with superior performance in the epoxy system was found to reside in an hydroxy amide derivative of a fatty acid, such as N-(B-hydroxyethyl) 12-hydroxy stearamide. Table 1 is presented to illustrate the temperature difference between incipient frozen conditions of the epoxy system and ultimate frozen conditions when the latter hydroxy amide was used as the thixotropic agent.

Table 1

| Parts by Weight of Base Resin | Parts by Weight of Thixotropic Agent | Incipient Temperature, °C. | Freezing Temperature, °C. |
|---|---|---|---|
| 70 Parts Epon 828, 30 Parts Epon 1007 | 10 | 88 | 86.5 |
|  | 8 | 85 | 83 |
|  | 6 | 83 | 81 |

Other hydroxy amides, such as N-(B-hydroxyethyl) 9,10-dihydroxy stearamide, can be employed to shift the transition temperatures of the resinous coatings and thus permit the application of coatings of varied thickness for the same dipping cycle.

It is emphasized at this point that the phenomenon experienced by the resin system under the influence of the thixotropic agent is a true gelation, but will be termed freezing. Gelation as presently employed in the art denotes the chemical phenomenon that a thermosetting resin undergoes from a substantially fluid condition to a cured substantially solid condition. At the latter condition, the thermosetting resin is no longer affected by such external factors as temperature and is not free, under normal situations, to return to its fluid state. The phenomenon of freezing the fluid resin system is not equivalent to curing, but is a physical interlocking or stiffening of the resin structure that occurs below a certain temperature because of the presence of the thixotropic agent, so that the system is no longer free to flow. When the temperature of the resin system is raised above that certain temperature the resin system is once again in the fluid state. Theoretically and under normal favorable conditions the resin system with the thixotropic agent added has indefinite shelf life because the latter agent does not affect the system chemically. The result is a physical mixture not affected chemically by differences in temperature. The thixotropic agent will generally be within the range of 0–25% for most practical applications.

As will be evidenced in the foregoing table, by varying the concentration of the thixotropic agent, the temperature for applying the coating material can be controlled. Normally, this is at about 10° C. above the freezing temperatures so that any entrapped air will have time to discharge into the ambient atmosphere before stiffening of the resin system.

It has been found in practice that the epoxy resin tends to string after an article is inserted and removed from a hot dip mixture. To obviate the tendency of the resin to string, it is necessary to add a suitable material which would add brittleness but which would not chemically affect the resin system or the hydroxy amide. Hydrogenated castor oil works well in accomplishing this end and the system's shelf life is still substantially unaffected. The castor oil should generally be within a range of 0–10% for most practical applications. The hydroxy amide and the hydrogenated castor oil can be simultaneously added to the resin system.

To permanently coat an article the resin film must be cured. Curing of the resin system is achieved by using a suitable catalyst or curing agent. Since the working temperature of the resin system is about 10° C. above the transition temperature, it is necessary to employ a curing agent or curing agents giving sufficient pot life at that temperature. A combination of curing agents can be used. For example, it was found that a mixture consisting of 70 parts of a low viscosity epoxy thermosetting resin, such as Shell's Epon 828, and a solid higher molecular weight viscosity modifier, such as Shell's Epon 1007, could be cured by using either triethanolamine alone or in conjunction with 2-phenyl triethanol amine as is illustrated by Table 2.

Table 2

| Resin Mixture 70 parts by Weight Epon 828, 30 Parts by Weight Epon 1007, 10 Parts by Weight N-(B-Hydroxyethyl) 12-Hydroxystearamide. | Curing Agent Triethanolamine, Parts/Hundred Resin Weight Basis | 2-Phenyl Triethanol Amine, Parts/Hundred Resin Weight Basis | Gel Time (Hours) | Curing Time (Hours) |
|---|---|---|---|---|
| Sample 1 | 10 | 0 | 3.75 | 6.5 |
| Sample 2 | 7.5 | 2.5 | 4.8 | 13.7 |
| Sample 3 | 7.5 | 0 | 5.5 | 13.7 |
| Sample 4 | 5.0 | 5.0 | 8.1 | 20.3 |

This resin mixture had a transition temperature of 86.5° C. and the curing temperature utilized was 75° C. There was no evidence of flow or slumping of the resin samples.

Triethanolamine has proved to be an effective curing agent for the resin mixtures since it chemically links up with the epoxy resins, hydroxy amide and the castor oil, the exact manner of linkage being presently unknown. Thus none of the constituents of the cured resin system is left unlinked to possibly alter the durability of the cured coating. The highest curing temperature is limited at the upper end by the freezing temperature of the mixture, which is a function of the concentration of the thixotropic agent employed. The rate of cure depends to a great degree on the type catalyst or curing agent used and on its concentration, as will be evidenced from Table 2.

Variations in pot life and usable pot temperature, dipping viscosity, coating thickness, freezing temperatures, congealing and curing temperatures, and curing time can be effected by appropriate changes in the basic formulation. The following additional example is presented to illustrate the preparation, use and results of the novel coating materials of this invention.

In a kettle, 30 parts by weight of high molecular weight Epon 1007 were dissolved in 70 parts by weight of low molecular weight Epon 828. To facilitate the dissolving of Epon 1007 in Epon 828, the kettle was slightly heated above room temperature. To this epoxy resin system were added 6 parts by weight of N-(B-hydroxyethyl) 12-hydroxystearamide and 4 parts by weight of hydrogenated castor oil. The latter two constituents were in powder form before mixing with the system. Subsequently 10 parts by weight of triethanolamine were added and the entire mixture was agitated to insure thorough mixing. This combination resulted in a transition or freezing temperature of 82° C. Various samples of this combination had pot lives of 1.5 to 2.5 hours.

Numerous articles were coated with this combination mix employing dip temperatures of 90° C. to 105° C. and curing temperatures of 65° C. to 75° C. which resulted in curing times ranging from 12 hours to 16 hours. The characteristics of a coating resulting from the typical formulation was a film possessing hardness, toughness, virtual transparency, low dielectric losses and low water vapor transmission.

From the foregoing it will be obvious that the numerous objects and advantages of the present invention are achieved.

We claim:

1. A method of uniformly coating an article with a thin thermosetting resin, said method comprising: heating to approximately 90° C. a mixture consisting of a major proportion of a low viscosity epoxy resin containing minor proportions of N-(B-hydroxyethyl) 12-hydroxystearamide, hydrogenated castor oil and triethanolamine; dipping said article into said mixture while said mixture is at approximately 90° C. to form a film on said article; removing said article from said mixture; cooling said film to approximately 85° C. whereby said film solidifies on said article; and further cooling said film until said film cures on said article.

2. A film forming mixture which is capable of solidifying upon cooling a few degrees below the melt temperature thereof, said mixture consisting of: a major proportion of epichlorohydrin-bisphenol reaction product having low viscosity; a minor proportion of a mixture consisting of approximately equal amounts of N-(B-hydroxyethyl) 12-hydroxystearamide and hydrogenated castor oil; and a minor proportion of triethanolamine, the proportion of triethanolamine being approximately the same as that of the combined mixture of N-(B-hydroxyethyl) 12-hydroxystearamide and hydrogenated castor oil.

3. A film forming mixture which is capable of solidifying upon cooling a few degrees below the melt temperature thereof, said mixture consisting of: 70 parts of a liquid epoxy of the epichlorohydrin-bisphenol-A variety with an epoxide equivalent of 175–210; 30 parts of a solid epoxy of the epichlorohydrin-bisphenol-A variety with an epoxide equivalent of 1650–2050; 6 parts N-(B-hydroxyethyl) 12-hydroxystearamide; 4 parts hydrogenated castor oil; and 10 parts triethanolamine.

References Cited in the file of this patent

UNITED STATES PATENTS

| 2,610,959 | Norlander | Sept. 16, 1952 |
| 2,783,214 | Homan | Feb. 26, 1957 |